(12) United States Patent
Yoshida (10) Patent No.: US 10,146,213 B2
(45) Date of Patent: Dec. 4, 2018

(54) NUMERICAL CONTROLLER FOR AUTOMATICALLY SWITCHING ACCELERATION/DECELERATION SETTING IN ACCORDANCE WITH MACHINING CONTENT OR STATE

(71) Applicant: FANUC Corporation, Yamanashi (JP)

(72) Inventor: Kouei Yoshida, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 215 days.

(21) Appl. No.: 15/168,082

(22) Filed: May 29, 2016

(65) Prior Publication Data

US 2016/0363927 A1 Dec. 15, 2016

(30) Foreign Application Priority Data

Jun. 9, 2015 (JP) ................................ 2015-116282

(51) Int. Cl.
   *G05B 19/416* (2006.01)
   *B23Q 5/18* (2006.01)

(52) U.S. Cl.
   CPC .......... *G05B 19/4163* (2013.01); *B23Q 5/18* (2013.01); *G05B 2219/43009* (2013.01); *G05B 2219/49098* (2013.01); *G05B 2219/49108* (2013.01)

(58) Field of Classification Search
   CPC ...... G05B 19/4163; G05B 2219/49098; G05B 2219/49108; B23Q 5/18
   See application file for complete search history.

(56) References Cited

U.S. PATENT DOCUMENTS

| 5,331,264 A | 7/1994 | Cheng et al. |
| 2009/0228135 A1* | 9/2009 | Nakamura ........... G05B 19/409 700/173 |

(Continued)

FOREIGN PATENT DOCUMENTS

| EP | 0794475 A1 | 9/1997 |
| JP | 62-245306 A | 10/1987 |

(Continued)

OTHER PUBLICATIONS

Office Action in JP Application No. 2015-116282, dated Jul. 4, 2017, 9 pp.

*Primary Examiner* — Vincent H Tran
(74) *Attorney, Agent, or Firm* — Hauptman Ham, LLP (57) ABSTRACT

A numerical controller of the invention includes: an acceleration setting data storage unit for storing acceleration setting data where an acceleration/deceleration setting of an axis of a target machine to be controlled is associated with an application condition including at least a tool number; an execution acceleration/deceleration setting storage unit for storing the acceleration/deceleration setting used when a control of the axis is executed; an acceleration/deceleration control unit for performing an acceleration/deceleration control process on the axis on the basis of the acceleration/deceleration setting set in the execution acceleration/deceleration setting storage unit; and an acceleration/deceleration setting unit for setting the acceleration/deceleration setting of the acceleration setting data where a tool number commanded in a tool selection command of a block read from a machining program satisfies the application condition in the execution acceleration/deceleration setting storage unit.

3 Claims, 7 Drawing Sheets

(56) References Cited

U.S. PATENT DOCUMENTS

| | | | | |
|---|---|---|---|---|
| 2012/0296475 | A1* | 11/2012 | Maekawa | B23Q 15/12 |
| | | | | 700/275 |
| 2015/0081084 | A1* | 3/2015 | Nishiwaki | B23G 1/16 |
| | | | | 700/170 |
| 2015/0134100 | A1 | 5/2015 | Iuchi et al. | |
| 2015/0261214 | A1* | 9/2015 | Maseki | G05B 19/4163 |
| | | | | 700/174 |

FOREIGN PATENT DOCUMENTS

| | | |
|---|---|---|
| JP | 5-46234 A | 2/1993 |
| JP | 6-155233 A | 6/1994 |
| JP | 9-91025 A | 4/1997 |
| JP | 9-106308 A | 4/1997 |
| JP | 2003-136369 A | 5/2003 |
| JP | 2004-237441 A | 8/2004 |
| JP | 2012-243009 A | 12/2012 |
| JP | 5152443 B1 | 2/2013 |
| WO | 2013/171850 A1 | 11/2013 |

* cited by examiner

| TOOL NUMBER | ACCELERATION/DECELERATION SETTING | | ... |
|---|---|---|---|
| | X-AXIS ACCELERATION [mm/sec$^2$] | X-AXIS ACCELERATION-CHANGE TIME [msec] | |
| 1 | 10000 | 100 | ⋮ |
| 2 | 5000 | 50 | ⋮ |
| ⋮ | ⋮ | ⋮ | ⋮ |

| NUMBER | ACCELERATION/DECELERATION SETTING | | ... | APPLICATION CONDITION | | | | ... |
|---|---|---|---|---|---|---|---|---|
| | X-AXIS ACCELERATION [mm/sec²] | X-AXIS ACCELERATION-CHANGE TIME [msec] | ... | SELECTED TOOL NUMBER | MOVEMENT TYPE | MOVEMENT AMOUNT [mm] | FEED RATE F [mm/min] | ... |
| 1 | 10000 | 100 | ... | 1 | STRAIGHT LINE | Z, Y=0mm and X=0~10mm | 1000≦F | ... |
| 2 | 5000 | 50 | ... | 1 | STRAIGHT LINE | Z, Y=0mm and X=0~10mm | 500≦F<1000 | ... |
| ... | ... | ... | ... | ... | ... | ... | ... | ... |

FIG. 9

| NUMBER | ACCELERATION/DECELERATION SETTING | | ... | APPLICATION CONDITION | | | | ... |
|---|---|---|---|---|---|---|---|---|
| | Y-AXIS ACCELERATION [mm/sec²] | Y-AXIS ACCELERATION-CHANGE TIME [msec] | ... | SELECTED TOOL NUMBER | MOVEMENT TYPE | FEED RATE F [mm/min] | CUTTING DEPTH ΔZ[mm] | ... |
| 1 | 10000 | 100 | ... | 1 | STRAIGHT LINE | F≦1000 | 2≦ΔZ | ... |
| 2 | 5000 | 50 | ... | 1 | STRAIGHT LINE | F≦1000 | ΔZ<2 | ... |
| ... | ... | ... | ... | ... | ... | ... | ... | ... |

NUMERICAL CONTROLLER FOR AUTOMATICALLY SWITCHING ACCELERATION/DECELERATION SETTING IN ACCORDANCE WITH MACHINING CONTENT OR STATE

RELATED APPLICATIONS

The present application claims priority to Japanese Patent Application Number 2015-116282 filed Jun. 9, 2015, the disclosure of which is hereby incorporated by reference herein in its entirety.

BACKGROUND OF THE INVENTION

1. Field of the Invention

The present invention relates to a numerical controller, and particularly, to a numerical controller with a function of automatically switching an acceleration/deceleration setting in accordance with machining content or a machining state.

2. Description of the Related Art

In machining with a machine tool, the related art such as JP 2004-237441 A and JP 06-155233 A is known as a technology of automatically setting a machining condition suitable for each machining, for example, to shorten a cycle time.

A technology disclosed in JP 2004-237441 A relates to a device which auto-generates a machining program, and a machining condition for minimizing "total cutting time X a tool wear cost per use" is obtained on the basis of an optimized tool path and tool design information including a pre-set cost of each tool and information of a life characteristic in the course of generating the machining program. Since a spindle rotation rate or a feed rate is handled as the machining condition and an acceleration/deceleration is not mentioned in this document, it is not intended to shorten the cycle time through a change of the acceleration/deceleration setting.

In a technology disclosed in JP 06-155233 A, the machining condition for shortening a machining time is obtained with respect to a machining program output by an automatic programming device in consideration of machining capability of each tool according to material of a workpiece or a limitation of the capability of the machine tool used for the machining. The machining condition is automatically calculated by a computer with reference to machining data in which the machining capability of the tool is described and a machine file in which the machining capability of a machine is described. Since the spindle rotation rate or the feed rate is handled as the machining condition and the acceleration/deceleration is not mentioned also in this document, it is not intended to shorten the cycle time through the change of the acceleration/deceleration setting.

The acceleration/deceleration setting such as a magnitude of the acceleration and an acceleration-change time is an important factor to determine a machining rate or a machining accuracy. For example, a drilling is less affected even by a high acceleration, but an end mill bottom surface machining is considerably affected by an increase of the acceleration and thus it is necessary to reduce the acceleration. As for setting of the acceleration, in the machining less affected even by the setting of the high acceleration, the high acceleration is set in order to shorten the cycle time (speed priority setting), and in a case where an accuracy is not improved without the setting of a low acceleration, it is desired to set the low acceleration (accuracy priority setting).

However, the related art disclosed in JP 2004-237441 A and JP 06-155233 A is insufficient in that the machining rate or the machining accuracy cannot be appropriately set since an automatic switch of the acceleration/deceleration setting is not considered as a method of setting the machining condition. In addition, in a case where a switch of the acceleration/deceleration setting is not performed automatically, a method in which a command to switch the acceleration/deceleration setting is included in the machining program is used as a method of switching the acceleration, but the method lays a large burden on an operator.

SUMMARY OF THE INVENTION

In this regard, an object of the invention is to provide a numerical controller with a function of automatically switching an acceleration/deceleration setting in accordance with machining content or a machining state.

To solve the problems described above, in the invention, the numerical controller is provided with the function of automatically switching the acceleration/deceleration setting such that the acceleration/deceleration setting suitable for each machining is applied to the numerical controller.

Then, the numerical controller according to the invention controls an axis provided in a machine tool performing a machining on a workpiece on the basis of a command of a block read from a machining program. The numerical controller includes: an acceleration setting data storage unit for storing acceleration setting data where an acceleration/deceleration setting of the axis is associated with an application condition including at least a tool number; an execution acceleration/deceleration setting storage unit for storing the acceleration/deceleration setting used when a control of the axis is executed; an acceleration/deceleration control unit for performing an acceleration/deceleration control process on the axis on the basis of the acceleration/deceleration setting set in the execution acceleration/deceleration setting storage unit; and an acceleration/deceleration setting unit for setting the acceleration/deceleration setting of the acceleration setting data where a tool number commanded in a tool selection command of the block read from the machining program satisfies the application condition in the execution acceleration/deceleration setting storage unit.

The application condition includes a condition of a command value in addition to the tool number, and the acceleration/deceleration setting unit sets the acceleration/deceleration setting of the acceleration setting data where a command of the block read from the machining program satisfies the application condition in the execution acceleration/deceleration setting storage unit.

In addition, the application condition further includes a condition of machining data, and the acceleration/deceleration setting unit sets the acceleration/deceleration setting of the acceleration setting data where the command of the block read from the machining program and the machining data of each block obtained through a simulation of the machining program satisfy the application condition in the execution acceleration/deceleration setting storage unit.

In addition, the acceleration/deceleration setting set in the execution acceleration/deceleration setting storage unit is set for each block of the machining program in advance by the acceleration/deceleration setting unit, and the acceleration/deceleration control unit performs the acceleration/deceleration control process using the acceleration/deceleration setting corresponding to a target block on which the acceleration/deceleration control process is performed.

According to the invention, the acceleration suitable for each machining can be applied. In the machining less affected even by the setting of the high acceleration, the high acceleration is set in order to shorten the machining time, and in the case of the machining in which the accuracy is not improved without the setting of the low acceleration, the low acceleration is set, and thus the machining time can be shortened with the necessary accuracy secured. In addition, a less burden is laid on the operator since the machining program is not necessary to include the command to switch the acceleration/deceleration setting.

BRIEF DESCRIPTION OF THE DRAWINGS

The above object, other objects, and features of the invention will become clear through the description of the following embodiments with reference to the accompanying drawings as follows.

DETAILED DESCRIPTION OF THE PREFERRED EMBODIMENTS

Hereinafter, an embodiment of the invention will be described with reference to the drawings.

To solve the problems described above, in the invention, an acceleration/deceleration setting is automatically switched through any one of following methods such that the acceleration/deceleration setting suitable for each machining is applied.

Method 1: The acceleration/deceleration setting is automatically switched simultaneously with a change of a tool.

Method 2: The acceleration/deceleration setting is automatically switched on the basis of information (a selected tool, a feed rate, a movement amount, and the like) of each block read during execution of a machining program.

Method 3: Once a cutting depth and the like are obtained through a simulation including information of a workpiece before the machining program is executed, the acceleration/deceleration setting is automatically switched on the basis of the obtained information such as the cutting depth and the information of each block.

First Embodiment

Figure 1:
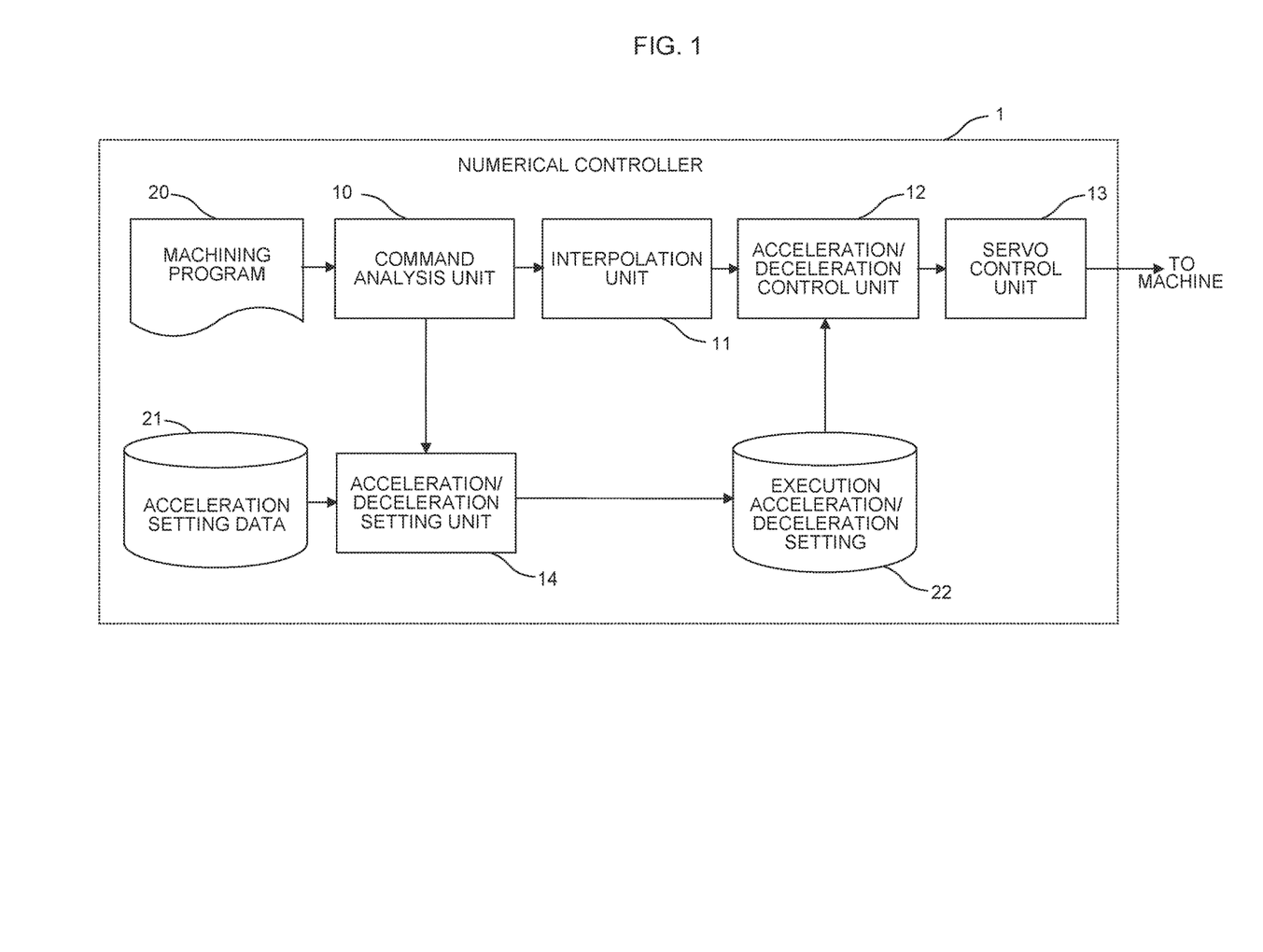
FIG. 1 is a functional block diagram of a numerical controller according to a first embodiment of the invention.

FIG. 1 is a functional block diagram of a numerical controller according to an embodiment of the invention. A numerical controller 1 of this embodiment includes a command analysis unit 10, an interpolation unit 11, an acceleration/deceleration control unit 12, a servo control unit 13, and an acceleration/deceleration setting unit 14. In addition, the numerical controller is provided with an acceleration setting data storage unit 21 in which acceleration setting data is stored in a region such as a memory (not illustrated) in advance, and an execution acceleration/deceleration setting storage unit 22.

The command analysis unit 10 sequentially reads blocks of a machining program 20 stored in a memory (not illustrated) and the like, analyzes a command of the subject block, and creates and outputs movement data.

The interpolation unit 11 performs an interpolation process to distribute the movement amount to each interpolation period on the basis of the movement data output from the command analysis unit 10, and outputs interpolation data to the acceleration/deceleration control unit.

The acceleration/deceleration control unit 12 performs an acceleration/deceleration process to apply an acceleration/deceleration on the basis of the acceleration/deceleration setting stored in the execution acceleration/deceleration setting storage unit 22 on the interpolation data output from the interpolation unit 11, and outputs the resultant data to the servo control unit 13.

The servo control unit 13 controls driving of each driving axis of a machine by controlling a servo motor and the like on the basis of the data output from the acceleration/deceleration control unit 12.

Incidentally, the above-described processes executed by the command analysis unit 10, the interpolation unit 11, the acceleration/deceleration control unit 12, and the servo control unit 13 are substantially the same as processes executed by a basic configuration of a general numerical controller.

When the machining program is executed, the acceleration/deceleration setting unit 14 obtains, on the basis of the acceleration setting data stored in the acceleration setting data storage unit 21, the acceleration/deceleration setting such as an acceleration and an acceleration-change time (time to reach a certain acceleration) suitable for a machining operation based on the machining program being executed, and sequentially sets the acceleration/deceleration setting in the execution acceleration/deceleration setting storage unit 22. In this embodiment, the acceleration/deceleration setting unit 14 sets the acceleration and the acceleration-change time according to the tool used in the machining.

Figure 2:
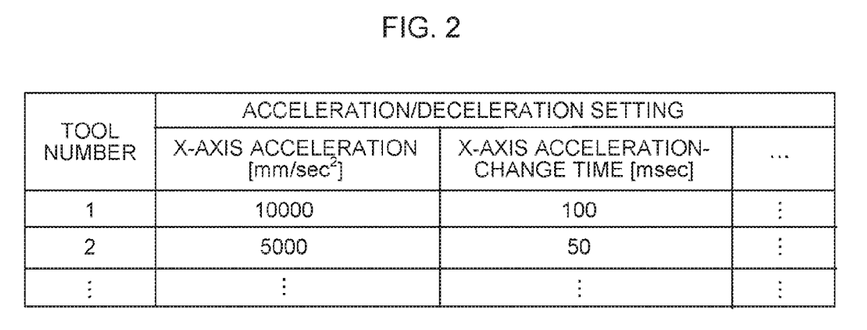
FIG. 2 is an example of acceleration setting data according to the first embodiment of the invention.

FIG. 2 illustrates an example of the acceleration setting data according to this embodiment. In the acceleration setting data of this embodiment, the acceleration/deceleration setting such as the acceleration and the acceleration-change time (time to reach a certain acceleration) suitable for an operation performed by a tool is stored in association with a tool number of the subject tool as a condition for applying the setting. In FIG. 2, "X-axis acceleration" and "X-axis acceleration-change time" are set in a setting item, but the acceleration, the acceleration-change time, or the like of an axis other than the X-axis may be also set in consideration of a characteristic of the axis. In addition, an acceleration/deceleration-related setting item required for the setting may be added in addition to the acceleration and the acceleration-change time.

When the command analysis unit 10 reads a tool exchange command from the machining program 20, the acceleration/deceleration setting unit 14 of this embodiment specifies a value of the acceleration/deceleration setting such as the acceleration and the acceleration-change time suitable for the operation performed with the tool on the basis of the tool number of the subject tool to be exchanged and with reference to the acceleration setting data storage unit. Then, the specified value of the acceleration/deceleration setting is set in the execution acceleration/deceleration setting storage unit 22.

With the above-described configuration, the acceleration/deceleration setting suitable for the exchanged tool is stored in the execution acceleration/deceleration setting storage unit 22 whenever the tool is exchanged at the time of the execution of the machining program, and the acceleration/deceleration control unit 12 executes the acceleration/deceleration process on the basis of the acceleration/deceleration setting set in the execution acceleration/deceleration setting storage unit 22. Therefore, in the machining program after the exchange of the tool, the acceleration/deceleration of each axis is controlled on the basis of the changed acceleration and the acceleration-change time.

Figure 3:
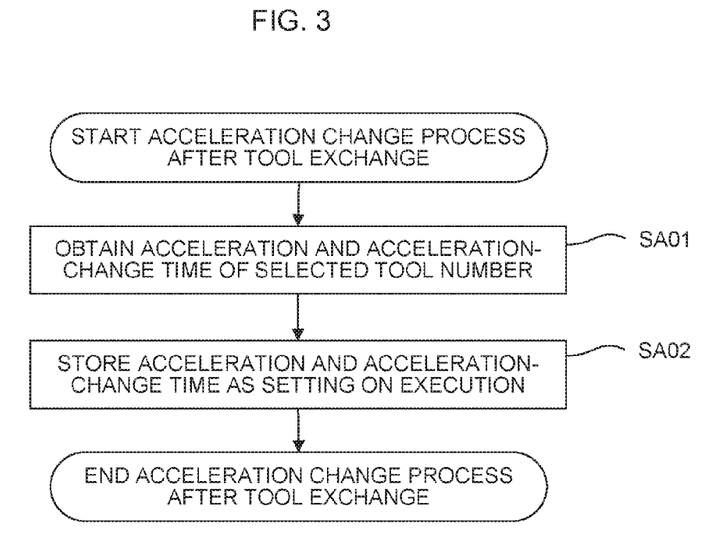
FIG. 3 is a flowchart of an acceleration/deceleration setting process according to the first embodiment of the invention.

FIG. 3 is a schematic flowchart of a process which the acceleration/deceleration setting unit 14 of this embodiment executes.

[Step SA01] The acceleration/deceleration setting unit 14 obtains the acceleration/deceleration setting such as the acceleration and the acceleration-change time, which is applied to the tool on the basis of the tool number of the exchanged tool, from the acceleration setting data stored in the acceleration setting data storage unit 21.

[Step SA02] The acceleration/deceleration setting unit 14 writes the acceleration/deceleration setting obtained in Step SA01 in the execution acceleration/deceleration setting storage unit 22 which the acceleration/deceleration control unit 12 refers to at the time of practical execution of an acceleration/deceleration control.

Figure 4:
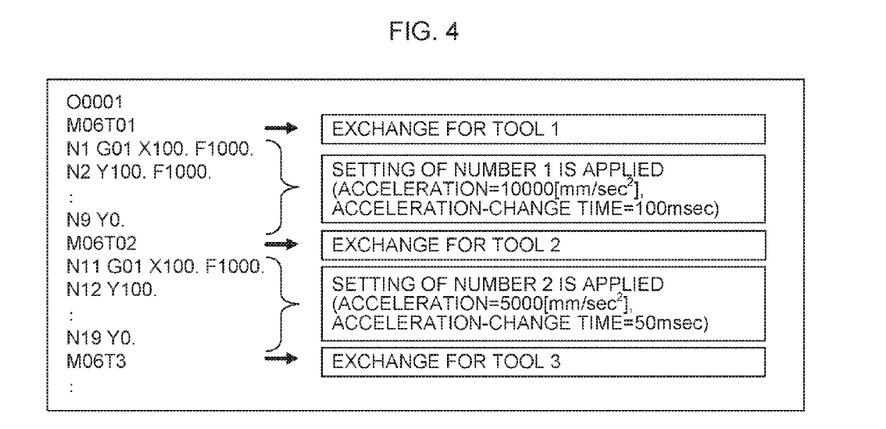
FIG. 4 is an example of a machining program according to the first embodiment of the invention.

FIG. 4 is a diagram illustrating a specific example of an acceleration/deceleration setting switch in the case of executing the machining program in the numerical controller of this embodiment. For example, as in FIG. 2, the acceleration setting data in which a value is set in each acceleration/deceleration setting item is stored in the acceleration setting data storage unit 21 in advance, and when the machining program illustrated in FIG. 4 is executed, in Blocks N1 to N9, the acceleration of 10000 [mm/sec²] and the acceleration-change time of 100 [msec] are set in the execution acceleration/deceleration setting storage unit 22 since the tool 1 is selected. In addition, in Blocks N11 to N19, acceleration 5000 [mm/sec²] and the acceleration-change time of 50 [msec] are set since a tool 2 is selected.

Second Embodiment

In the first embodiment, the acceleration/deceleration setting is switched depending on only the selected tool number, but in this embodiment, an example is described in which the acceleration and the acceleration-change time are switched on the basis of a movement type, the movement amount, the feed rate, or the like commanded at each block of the machining program.

The configuration of the numerical controller 1 according to this embodiment is the same as in the first embodiment.

Figure 5:
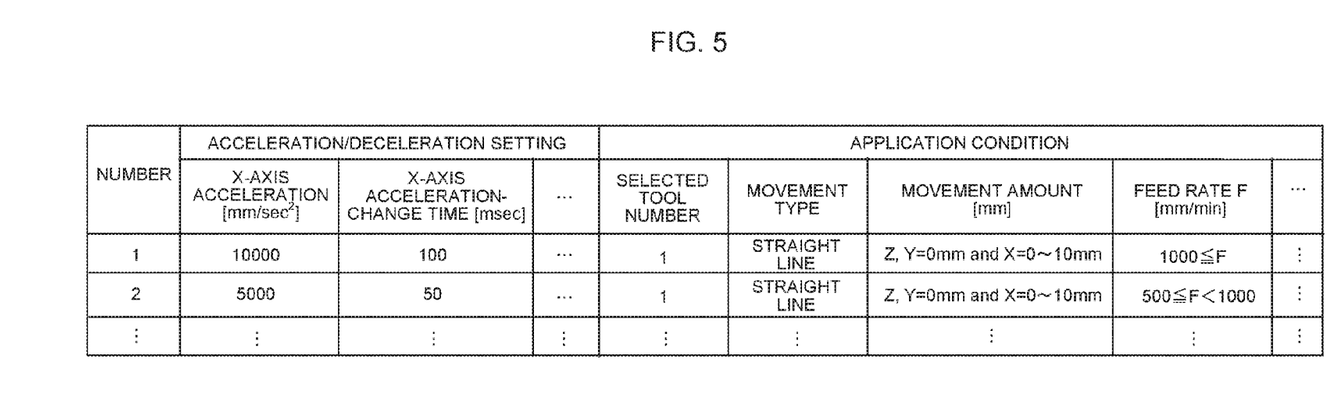
FIG. 5 is an example of acceleration setting data according to a second embodiment of the invention.

FIG. 5 illustrates an example of acceleration setting data according to this embodiment. The acceleration setting applied depending on a satisfied application condition is stored in the acceleration setting data of this embodiment. As illustrated in FIG. 5, in addition to the tool number, the conditions of the command values such as the movement type, the movement amount, and the feed rate are set as the application condition, and the acceleration setting such as the acceleration and the acceleration-change time is stored in association with the conditions. In the example illustrated in FIG. 5, in a case where the tool 1 is selected and the movement type commanded by the machining program is a straight line only in the X-axis direction by 0 to 10 mm, the acceleration/deceleration setting of Number 1 is applied in the case of the feed rate F of 1000 [mm/min] or more and the acceleration/deceleration setting of Number 2 is applied in the case of the feed rate F of 500≤F<1000 [mm/min].

Incidentally, in FIG. 5, the conditions of the command values such as the selected tool, the movement type, the movement amount, and the feed rate are exemplified as the application condition, and besides, information (for example, a selection plane, a spindle rotation rate, and various operation modes) obtained when the machining program is read may be properly adopted as the condition of the command value.

In addition, since the machining program can be read in advance in the general numerical controller, information of a plurality of blocks including the block scheduled to be executed next as well as the block being executing is read, and thus, for example, the application condition can be set such that acceleration is switched in consideration of the movement amounts of the plurality of blocks.

On the basis of above-described acceleration setting data, the acceleration/deceleration setting unit 14 stores the acceleration/deceleration setting suitable for the machining command of each block of the machining program in the execution acceleration/deceleration setting storage unit 22 at the time of the execution of the machining program so that the acceleration can be switched according to the command even in the same tool. Therefore, the acceleration can be switched more finely.

Figure 6:
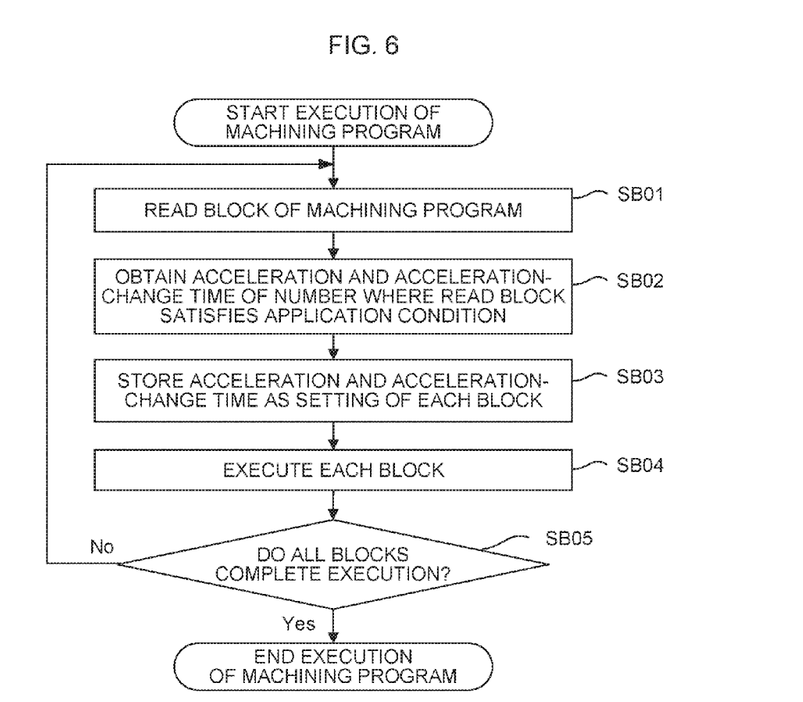
FIG. 6 is a flowchart of a process executed in a numerical controller according to the second embodiment of the invention.

FIG. 6 is a schematic flowchart of a process executed in the numerical controller of this embodiment.

[Step SB01] The command analysis unit 10 reads and analyzes the block of the machining program, and outputs an analysis result to the interpolation unit 11 and the acceleration/deceleration setting unit 14.

[Step SB02] The acceleration/deceleration setting unit 14 obtains the acceleration/deceleration setting, which accords with the application condition, such as the acceleration and the acceleration-change time on the basis of the information such as the currently-selected tool or the content of the command of the block which the command analysis unit 10 reads and analyzes in Step SB01 and with reference to the acceleration setting data stored in the acceleration setting data storage unit 21.

[Step SB03] The acceleration/deceleration setting unit 14 writes the acceleration/deceleration setting obtained in Step SB02 in the execution acceleration/deceleration setting storage unit 22 which the acceleration/deceleration control unit 12 refers to at the time of the practical execution of the acceleration/deceleration control.

[Step SB04] The execution of the block is performed. The acceleration/deceleration control unit 12 performs the execution by using the acceleration and the acceleration-change time stored as the information of each block.

[Step SB05] It is determined whether all the blocks of the machining program complete the execution. In the case of the completion, the execution of the machining program is ended, and if not, the procedure returns to Step SB01.

Figure 7:
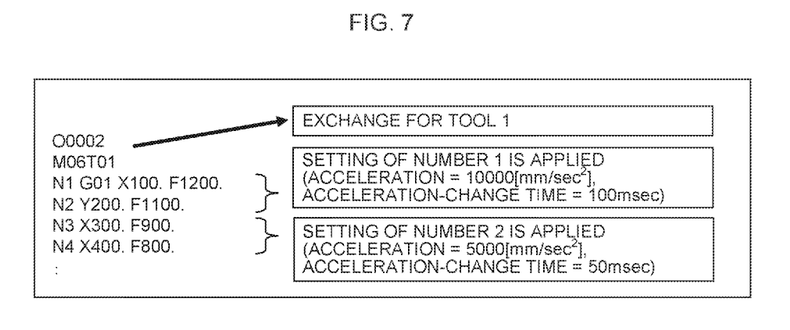
FIG. 7 is an example of a machining program according to the second embodiment of the invention.

FIG. 7 is a diagram illustrating a specific example of an acceleration/deceleration setting switch in the case of executing the machining program in the numerical controller of this embodiment. For example, as in FIG. 5, the acceleration setting data in which a value is set in each acceleration/deceleration setting item is stored in the acceleration setting data storage unit 21 in advance, and when the machining program illustrated in FIG. 7 is executed, in Blocks N1 and N2, the acceleration of 10000 [mm/sec$^2$] and the acceleration-change time of 100 [msec] of Number 1 are set since the tool 1 is selected, the movement type is the straight line in the X-axis direction, and the feed rate F is 1000 [mm/min] or more, and in N3 and N4, the acceleration of 5000 [mm/sec$^2$] and the acceleration-change time of 50 [msec] of Number 2 are set since the feed rate F is 500≤F<1000 [mm/min].

Third Embodiment

In the first and second embodiments, a determination process of the applied acceleration is executed during the execution of the machining program, but in a third embodiment, once the simulation is performed using the information such as a dimension or the material quality of the workpiece before the machining program is practically executed, machining data such as the cutting depth, a cutting amount, and an axial load is created, and the data is used for determining the acceleration/deceleration setting. Therefore, the acceleration can be switched more finely than in the first and second embodiments.

Figure 8:
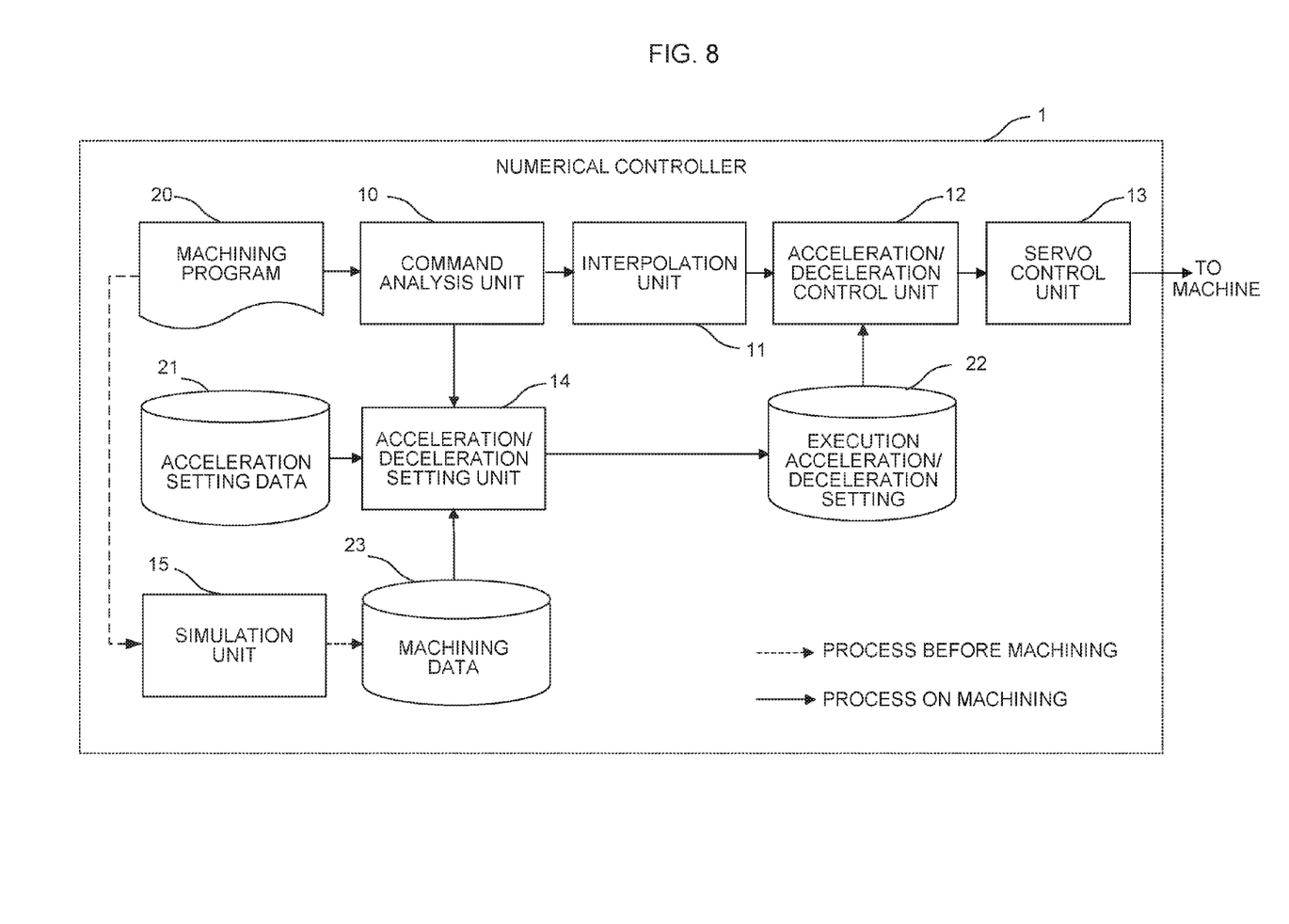
FIG. 8 is a functional block diagram of a numerical controller according to a third embodiment of the invention.

FIG. 8 is a functional block diagram of a numerical controller according to this embodiment. The numerical controller 1 of this embodiment is provided with a simulation unit 15 and a machining data storage unit 23 in addition to each functional block provided in the numerical controller 1 of the first embodiment.

The simulation unit 15 executes a machining simulation on the basis of the machining program and the information such as the dimension or the material quality of the workpiece, and the machining data such as the cutting depth or the cutting amount of the workpiece and the axial load in a machining control executed on the basis of the command from each block of the machining program is stored as an execution result in the machining data storage unit 23 in association with the number of the block.

Figure 9:
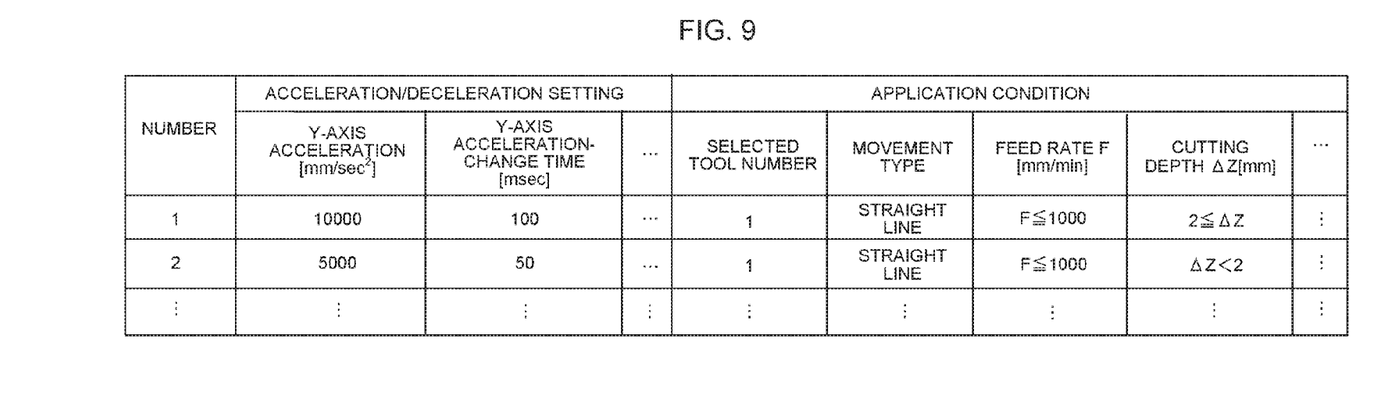
FIG. 9 is an example of acceleration setting data according to the third embodiment of the invention.

In addition, in the acceleration setting data storage unit 21 of this embodiment, conditional acceleration setting data is prepared in advance as in FIG. 9. In the acceleration setting data of this embodiment, the condition of the machining data such as the cutting depth is further added in the application condition of the conditional acceleration setting data in a second embodiment.

Then, the acceleration/deceleration setting unit 14 of this embodiment stores the acceleration/deceleration setting of each block of the machining program, which is suitable for the machining operation based on the command of the subject block, on the basis of the command of the subject block and the machining data, which is stored in the machining data storage unit 23 and corresponds to the subject block, and with reference to the acceleration setting data storage unit 21 at the time of the execution of the machining program so that the acceleration/deceleration can be switched according to the command and the information such as the cutting depth of the workpiece under the subject command. Therefore, the acceleration/deceleration can be switched more finely.

Figure 10:
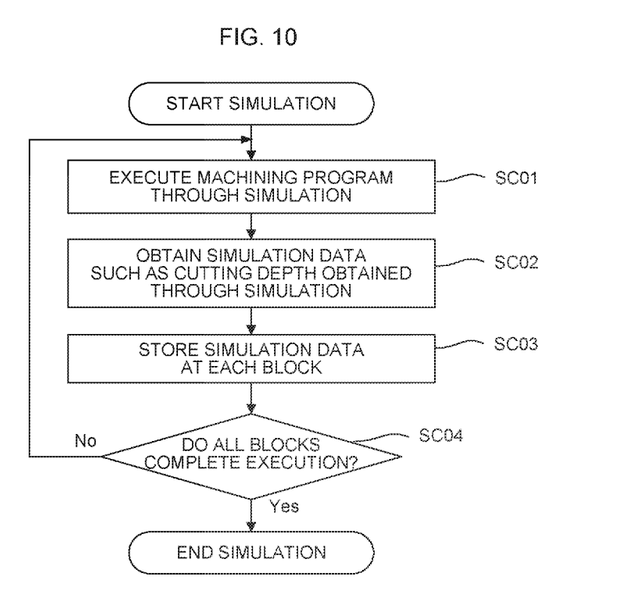
FIG. 10 is a flowchart of a simulation process according to the third embodiment of the invention.

FIG. 10 is a schematic flowchart of the process executed in the simulation unit 15 of this embodiment.
[Step SC01] The block of the machining program is read and analyzed and the simulation is executed.
[Step SC02] The machining data such as the cutting depth is obtained as a result of executing the simulation of each block.
[Step SC03] The machining data obtained in Step SC02 is stored in association with each block in the machining data storage unit 23.
[Step SC04] It is determined whether all blocks of the machining program completes the execution. In the case of the completion, the execution of the machining program is ended, and if not, the procedure returns to Step SC01.

Figure 11:
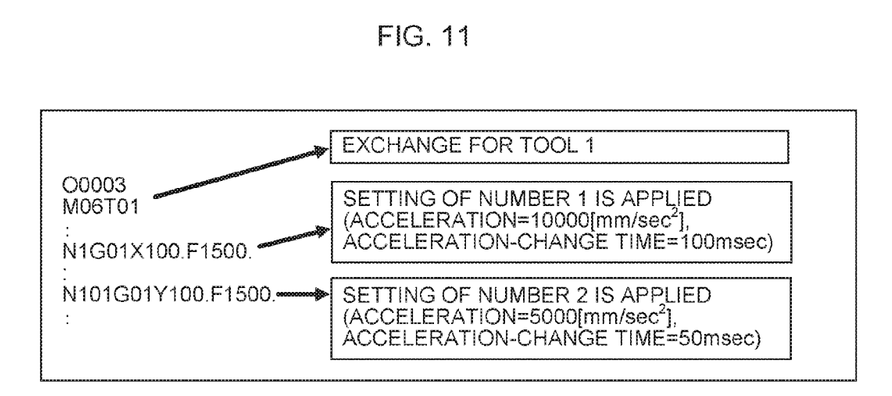
FIG. 11 is an example of a machining program according to the third embodiment of the invention.
Figure 12:
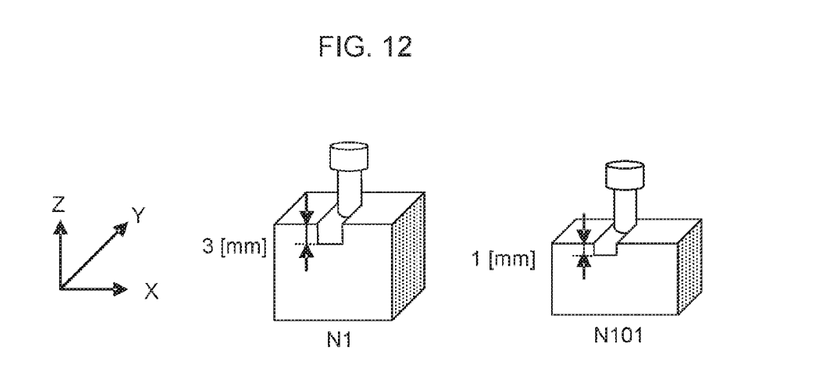
FIG. 12 is a diagram illustrating a cutting depth obtained through a simulation.

FIG. 11 is a diagram illustrating a specific example of an acceleration/deceleration setting switch in the case of executing the machining program in the numerical controller of this embodiment. As in FIG. 9, the acceleration setting data in which a value is set in each acceleration/deceleration setting item is stored in the acceleration setting data storage unit 21 in advance, and as the result of the simulation in which the dimension of the workpiece is input, the cutting depth in N1 is 3 [mm] and the cutting depth in N101 is 1 [mm] as illustrated in FIG. 12. In this case, when the machining program illustrated in FIG. 11 is executed, in Block N1, the acceleration of 10000 [mm/sec$^2$] and the acceleration-change time of 100 [msec] of Number 1 are set since the tool 1 is selected, the movement type is the straight line, the feed rate F is in a range of 1000 [mm/min] or more, and the cutting depth is in a range of 2 [mm] or more, and in N101, the acceleration of 5000 [mm/sec$^2$] and the acceleration-change time of 50 [msec] of Number 2 are set since the cutting depth is less than 2 [mm].

Hereinbefore, although the embodiments of the invention are described, the invention is not limited to the above-described embodiments and can be implemented in various modes by modifying the above-described embodiments properly.

For example, the above-described embodiments describe that the execution acceleration/deceleration setting storage unit 22 is provided with the region for storing a set of the acceleration/deceleration setting, and the acceleration/deceleration setting unit 14 stores the acceleration/deceleration setting in the execution acceleration/deceleration setting storage unit 22 in synchronization with the execution of the block of the machining program. However, the acceleration/deceleration setting stored in the execution acceleration/deceleration setting storage unit 22 may be set to be stored in association with the block number of each block and the like, and the acceleration/deceleration control unit 12 may read, according to a target block number of the current acceleration/deceleration setting, the acceleration/deceleration setting corresponding to the subject block from the execution acceleration/deceleration setting storage unit 22, and may perform the acceleration/deceleration process on the basis of the read acceleration/deceleration setting.

In the case of adopting this configuration, the acceleration/deceleration setting unit 14 can record the acceleration/deceleration setting in the execution acceleration/deceleration setting storage unit 22 such that the acceleration/deceleration settings of a plurality of blocks are be buffered prior to the execution of each block during executing the machining program or the acceleration/deceleration settings of all the blocks are be recorded in advance before the execution of the machining program 20 starts. In addition, in the third embodiment, the acceleration/deceleration setting unit 14 can record the acceleration/deceleration setting in the execution acceleration/deceleration setting storage unit 22 simultaneously when the simulation unit 15 executes the simulation.

Therefore, an amount of data which is to be stored in the execution acceleration/deceleration setting storage unit 22 is increased, but since it is not necessary that the acceleration/deceleration setting unit 14 performs the process during executing the machining program, a total load of the numerical controller 1 is advantageously reduced in the case of finely changing the acceleration/deceleration setting, for example, executing the machining program formed of the minute block and the like.

In addition, instead of storing the acceleration/deceleration setting in the execution acceleration/deceleration setting storage unit 22, the machining program can be rewritten in advance to include a command to rewrite an acceleration parameter.

In addition, the above-described third embodiment has described a configuration in which the simulation unit 15 is provided in the numerical controller 1, but the simulation unit 15 may be mounted in a device such as a computer separately from the numerical controller 1.

Further, the above-described second and third embodiments has described that the determination is performed on an accordance with the application condition of the acceleration setting data on the basis of the command value such as the feed rate F which is commanded from the machining program, but it is easily understood by a person skilled in the art that each factor which affects the command values, for example, various signals such as an override or a parameter set in the numerical controller is necessarily considered in the determination on the accordance with the application condition.

Hereinbefore, although the embodiments of the invention are described, the invention is not limited to the above-described embodiments and can be implemented in another mode by modifying the above-described embodiments properly.

The invention claimed is:

1. A numerical controller controlling an axis provided in a machine tool performing a machining on a workpiece on the basis of a command of a block read from a machining program, the numerical controller comprising:
an acceleration setting data storage unit for storing acceleration setting data where an acceleration/deceleration setting of the axis is associated with an application condition including at least a tool number;
an execution acceleration/deceleration setting storage unit for storing the acceleration/deceleration setting used when a control of the axis is executed;
an acceleration/deceleration control unit for performing an acceleration/deceleration control process on the axis on the basis of the acceleration/deceleration setting set in the execution acceleration/deceleration setting storage unit and
an acceleration/deceleration setting unit for setting the acceleration/deceleration setting of the acceleration setting data where a tool number commanded in a tool selection command of the block read from the machining program satisfies the application condition in the execution acceleration/deceleration setting storage unit,
wherein
the application condition further includes a condition of machining data, and
the acceleration/deceleration setting unit sets the acceleration/deceleration setting of the acceleration setting data where the command of the block read from the machining program and the machining data of each block obtained through a simulation of the machining program satisfy the application condition in the execution acceleration/deceleration setting storage unit.

2. The numerical controller according to claim 1, wherein the application condition includes a condition of a command value in addition to the tool number, and
the acceleration/deceleration setting unit sets the acceleration/deceleration setting of the acceleration setting data where a command of the block read from the machining program satisfies the application condition in the execution acceleration/deceleration setting storage unit.

3. The numerical controller according to claim 1, wherein the acceleration/deceleration setting set in the execution acceleration/deceleration setting storage unit is set for each block of the machining program in advance by the acceleration/deceleration setting unit, and
the acceleration/deceleration control unit performs the acceleration/deceleration control process using the acceleration/deceleration setting corresponding to a target block on which the acceleration/deceleration control process is performed.

* * * * *